(12) United States Patent
Love

(10) Patent No.: US 6,445,820 B1
(45) Date of Patent: Sep. 3, 2002

(54) METHOD FOR CONDUCTING ANALYSIS OF HANDWRITING

(75) Inventor: Patrick B. Love, Bellingham, WA (US)

(73) Assignee: Limbic Systems, Inc., Bellingham, WA (US)

( * ) Notice: Subject to any disclaimer, the term of this patent is extended or adjusted under 35 U.S.C. 154(b) by 0 days.

(21) Appl. No.: 09/344,897

(22) Filed: Jun. 22, 1999

Related U.S. Application Data

(60) Provisional application No. 60/091,089, filed on Jun. 29, 1998.

(51) Int. Cl.[7] .......................... G06K 9/00; G06K 9/18; G06K 9/22; G06K 9/46; G06K 9/68

(52) U.S. Cl. .............. 382/187; 382/115; 382/116; 382/119; 382/181; 382/186; 382/188; 382/154; 382/202; 382/218; 382/313; 382/314; 902/3; 902/5

(58) Field of Search .................. 382/181–187, 382/189, 201, 218, 115, 116, 119, 120, 154, 188, 190, 202, 209, 237, 274, 276, 291, 292, 312, 313, 314; 340/5.81, 5.82; 902/3, 5

(56) References Cited

U.S. PATENT DOCUMENTS

| | | | | |
|---|---|---|---|---|
| 4,024,500 A | * | 5/1977 | Herbst et al. | 382/178 |
| 5,251,265 A | * | 10/1993 | Dohle et al. | 382/123 |
| 5,347,589 A | * | 9/1994 | Meeks et al. | 382/119 |
| 5,359,671 A | * | 10/1994 | Rao | 382/225 |
| 5,730,602 A | * | 3/1998 | Gierhart et al. | 434/155 |
| 5,740,273 A | * | 4/1998 | Parthasarathy et al. | 382/187 |
| 5,774,582 A | * | 6/1998 | Gat et al. | 382/186 |

OTHER PUBLICATIONS

Richard A. Dusak; "The Forensic Information System for Handwriting (FISH)"; presentation material for American of Forensic Sciences annual meeting Feb. 15–20, 1993; 17 pages.

(List continued on next page.)

*Primary Examiner*—Leo Boudreau
*Assistant Examiner*—Daniel G. Mariam
(74) *Attorney, Agent, or Firm*—Michael R. Schacht

(57) ABSTRACT

A method for electronic analysis of handwriting samples. A digital bit-map of handwriting samples created, using a digital camera or electronic scanner. The bit-map is then marked at selected points using a cursor to obtain measurements, such as the slant angles of strokes and height measurements of major areas in the writing. The measurements are tabulated and may be used to authenticate the handwriting sample. Also, the tabulated results may be compared with predetermined standard profiles for determining certain characteristics relating to the person who produced the handwriting sample. The invention also provides a method for determining the pressure and angle of the writing instrument, by creating a three-dimensional representation of portions of the writing sample for measurement and analysis.

22 Claims, 7 Drawing Sheets

OTHER PUBLICATIONS

Communication Intelligence Corporation; "Sign–it" (formerly "PenOp"); sales literature; Copyright dates 2000, 2001; 6 pages.

Pikaso Software Inc.; "Write–On –Handwriting Comparison Software"; sales literature; undated; 2 pages.

Sheila Lowe & Associates; "The Write Choice –Handwriting Analysis Software for Windows"; web site literature printed Oct. 28, 2001 and Oct. 25, 2001; 23 pages.

Image Metrology Aps; "Scanning Probe Image Processor (SPIP) for Windows"; sales literature; Oct. 17, 2001; 4 pages.

National Instruments; "LabVIEW"; brochure and seminar information; copyright dates 1999 and 2000; 4 pages.

Sensor Products Inc.; "TOPAQ The Tactile Force Analysis System"; sales literature; copyright date 2000; 6 pages.

Image Content Technology LLC; "Lucis DHP Algorithm" Technical Overview; Copyright date 1999; 39 pages.

MediaCybernetics; "Image Pro PLUS The Proven Solution"; web site literature; printed Oct. 18, 2001; 8 pages.

Kitware: "Visualization Toolkit"; web site literature; printed Oct. 23, 2001, 2 pages.

* cited by examiner

FIG. 5

COMPREHENSIVE GRAPHOANALYTICAL TRAIT INVENTORY

| EMOTIONS | MENTAL PROCESSES | INTEGRITY | SOCIAL TRAITS | APTITUDES |
|---|---|---|---|---|
| | | | | (Major supportive traits and characteristics are shown under aptitudes. These lists are not inclusive.) |
| *Slant* | 9 Analytical | *Supportive Influences* | *Positive Influences* | |
| F- | __ Comprehensive | | | |
| __ Extreme withdrawal | 8 Cumulative (logical) | 9 Ambition | 7 Dignity | BUSINESS |
| __ FA | __ Exploratory | 8 Broadmindedness | 5 Diplomacy | |
| 7 Withdrawal | __ Investigative | 8 Caution | 8 Frankness | 8 Decisiveness |
| __ AB | | 7 Conservatism | 5 Generosity | 8 Determination |
| 3 Objectiveness | *Intensifying Influences* | 8 Determination | __ Humor | 5 Diplomacy |
| __ BC | | 7 Dignity | 10 Imagination | __ Fluidity |
| __ Mildly responsive | 8 Broad-mindedness | __ Directness | 8 Loyalty | 9 Imagination |
| __ CD | 5 Concentration | 8 Frankness | 7 Optimism | 9 Initiative |
| __ Moderately responsive | 7 Conservatism | 5 Generosity | 5 Physical-mindedness | 8 Organizational ability |
| __ DE | 8 Decisiveness | 8 Loyalty | 9 Poise | 9 Self-confidence |
| __ Highly responsive | 8 Details, attention to | 9 Pride | 9 Pride | |
| __ E+ | __ Directness | 7 Rhythm | 9 Self-confidence | CULTURAL |
| __ Extremely responsive | __ Fluidity | 9 Self-confidence | 9 Self-control | |
| | 4 Generosity | 10 Self-control | 8 Self-reliance | __ Color appreciation |
| *Depth* | __ Independent thinking | 9 Sincerity | 8 Sensuousness | __ Creativity |
| | __ Intuitiveness | | 5 Sympathy | __ Directness |
| __ Light | 7 Loyalty | *Reductive Influences* | 5 Talkativeness | __ Fluidity |
| __ Moderate | 8 Optimism | | | __ Imagination |
| 8 Moderate-heavy | 8 Organizational ability | __ Deceptiveness | *Negative Influences* | __ Intuitiveness |
| __ Heavy | 7 Perfectionism | 7 Evasiveness | | __ Line appreciation |
| | 8 Positiveness | __ Impulsiveness | __ Clannishness | __ Literary leanings |
| *Controls* | 8 Responsibility, desire for | __ Prejudice | __ Deceptiveness | __ (Greek e's, delta d's) |
| | 6 Rhythm | __ Pride, lack of | __ Domineering nature | __ Manual dexterity |
| 6 Caution | 7 Tenacity | __ Procrastination | 8 Exaggeration | __ Rhythm |
| 7 Conservatism | | __ Secretiveness | __ Extravagance | __ Showmanship |
| 8 Decisiveness | *Reductive Influences* | __ Self-deceit | __ Idiosyncrasy | |
| 6 Dignity | | __ Selfishness | __ Impatience | |
| 8 Poise | 3 Confusion of interests | __ Sensuality | | |
| 9 Pride | 2 Detail, inattention to | | | |

METHOD FOR CONDUCTING ANALYSIS OF HANDWRITING

The present Application claims the benefit of priority from U.S. Provisional application Ser. No. 60/091,089 filed Jun. 29, 1998.

BACKGROUND a. Field of the Invention

The present invention relates generally to methods for the analysis of a person's handwriting, and, more particularly, to analysis of handwriting using a computer-assisted methodology.

b. Background Art

The analysis of handwriting, referred to as graphoanalysis, is ordinarily conducted for one of two purposes: (a) comparison of handwriting samples to determine whether or not the writer is the same person in both instances, and (b) evaluation of the person's writing relative to predetermined criteria to ascertain one or more aspects of the writer's personality, such as emotional characteristics. Examples of the first category often include law enforcement work, such as the determination of whether or not a signature or document is a forgery, or determination of whether a document was written by a suspected person. Examples of the second category, in turn, include evaluation of a person's personality and emotional responsiveness to determine their suitability for employment in a position requiring particular skills or personality traits, or their assignment to work with a certain group of people or to perform certain tasks.

Both categories of analysis require obtaining extensive, painstaking measurements on one or more handwriting specimens. In the first category, that of determining whether or not a particular person wrote a certain document, numerous, often minute details of the person's writing must be measured and cataloged, much in the manner of fingerprint analysis. In the second type of work, that of determining a person's personality or emotional characteristics, multiple measurements of certain features of the writing are taken and then analyzed statistically for comparison with the predetermined standards, which for the most part have been derived on an empirical basis from the analysis of handwriting produced by various persons having known personalities or emotional characteristics.

While graphoanalysis for these and other purposes is a valued tool in many industries/fields, its widespread use has become increasingly hampered by the fact that the necessary measurements have up to this time been performed almost invariably by manual means, using a magnifying glass, ruler, protractor, pencil, and other unsophisticated tools. For example, to perform a personality analysis, the graphoanalyst must use a ruler or similar guide to determine the base line of the writing, visually determine certain key points on various letters, and then measure the slant angle of scores or even hundreds of these letters visually using a protractor; as with most forms of statistical analysis, a fairly high number of measurements is required to form a basis for a reliable analysis. The great deal of time and labor which must thus be spent to professionally analyze even a single person's handwriting, especially in view of rapidly rising labor costs, has often rendered this otherwise valuable tool uneconomical for use in all but the most important cases. Moreover, since the manual measurement techniques require drawing various lines and marks on the writing sample using a pencil or other writing instrument, these necessarily deface and/or damage the original to one extent or another, which renders obtaining subsequent measurements (e.g., by a second graphoanalyst) more difficult and otherwise decreases the usefulness of the original document.

Perhaps an even more serious problem is the degree of variability and sometimes inaccuracy which is inherent in the conventional, manual graphoanalysis techniques. Human judgment and therefore human error is invariably involved to some extent in such techniques, and therefore the quality of the analysis is heavily dependent on the manual skills of the individual graphoanalyst. Moreover, since each analysis often requires hundreds of measurements, fatigue often become a significant factor, and can impair the efforts of even the most skilled practitioner. Still further, determining the base line and measurement points on the handwriting specimens is a high subjective process, which results in a high degree of variability between the measurements taken from the same sample by different analysts. Not only do these various factors impact the accuracy of each analysis, they also make it difficult to properly compare the measurements to the precise standards which are necessary for a proper determination of personality/emotional characteristics.

As a result, although the value of graphoanalysis is well established, particularly in Europe (for example, handwriting analysis is used in employment screening for 40% of job applicants in Great Britain, and for 80% of applicants in France and Israel), the inefficiencies, inaccuracies and variabilities which are inherent in the manual measurement techniques have stymied its further, widespread application. For example, graphoanalysis is potentially an extremely valuable tool for the human resources departments of commercial enterprises and governmental agencies, to help determine the suitability of a person for employment or assignment to a particular position or team, but the existing problems with cost and accuracy have thus far limited its adoption in these arenas.

Similarly, the difficulty in obtaining economical, accurate analysis of handwriting specimens has rendered this resource unavailable to many criminal and civil investigators, and this has been a particular problem for police departments which are located outside of major metropolitan areas, where both the availability of skilled graphoanalysts and departmental budgets are often limited.

Accordingly, there exists a need for a method for measurement one or more characteristics of a handwriting specimen which does not require these measurements to be performed manually, and which therefore eliminates the element of inaccuracy and variability in these measurements. Furthermore, there exists a need for such a method which enables large numbers of such measurements to be taken, compiled, and analyzed quickly and economically. Still further, there exists a need for such a method which enables such measurements to be taken in a standardized manner, so that these can be compared with confidence to precise, predetermined standards which assign personality characteristics or other elements to such measurements. Still further, there exists a need for such a method which permits such measurements to be taken and used by a trained graphoanalyst who is not necessarily located in the vicinity as the client or other requester, so as to make this resource more readily available to entities located outside of major metropolitan areas.

SUMMARY OF THE INVENTION

The present invention has solved the problems cited above, and is a method for accurate and quantitative analysis of a handwriting sample.

The first step in the method is to create a digital bit-map of the handwriting sample, as by using an electronic scanner or digital camera. The bit-map file is then used to create a digital image of the writing sample, and a cursor is used to mark selected points on elements of the writing for measurement. The measurements include determination of the slant angle of strokes in the handwriting and measurement of heights of the major areas of the writing.

The measurements are tabulated and/or categorized according to a predetermined scheme, and these results are then compared with a predetermined standard for determining certain characteristics relating to the person who produced the handwriting sample.

The slant angle measurements can be made by using the cursor establish a base line for each stroke and a second line between a starting point where the stroke lifts off the base line of the stroke, and an ending point where the stroke ceases to rise, and then calculating the angle between the two lines. The cursor may also be used to mark the tops of the letters for measuring the height of the areas of the writing, by calculating the vertical distance between the tops of the letters and base line.

The moving cursor may preferably be a feeler cursor, which moves upwardly or downwardly across the display from its release point to the point where the writing begins, so that operator can simply position the cursor above or below the appropriate point on the writing and the cursor will then move upwardly or downwardly automatically to accurately identify and mark the upper/lower end of the stroke.

The method may also include the step of measuring the relative darkness of the pen or pencil line which forms a stroke, by using a cursor to take a cut taken across the stroke and then translating the measured grey-scale darkness at each point so as to form a two-dimensional display, in which the depth of points along a "valley" (or, in some embodiments, an upwardly projecting "ridge") represent the darknesses of the points relative to the paper.

The depth measurements may be tabulated and analyzed in a manner similar to the angle and height measurements. Moreover, the two-dimensional display may be divided vertically from its lowermost depth or point, and then the areas of the two sides of the valley can be calculated to determine which side is the darker, and therefore on which side the pressure of the pen/pencil point was greatest as the writing was formed. This information may be used to determine whether the person's right or left hand was used to create the writing sample.

Furthermore, the method may include the step of compiling the two-dimensional depth measurements along a continuous length of a selected stroke, and then panning the view so as to create a 3-dimensional image of the stroke in which the writing appears as a continuous valley or ridge. The relative weights of the two sides of the stroke can be determined by dividing the 3-dimensional image vertically from its lowermost or uppermost limit and then calculating the volume of the valley/ridge on either side of the divide.

These and other features of the present invention will be apparent from a reading of the following specification in association with the figures which are referred to therein.

BRIEF DESCRIPTION OF THE DRAWINGS

FIG. 5 is a portion of a comprehensive trait inventory produced for the writing specimen of FIG. 3 in accordance with the method of the present invention;

DETAILED DESCRIPTION

As was noted above, the present invention represents an important advance over prior art graphoanalytical techniques, in that this employs software-directed methodology to measure the relevant elements and characteristics of a digitized image of the handwriting sample, thereby eliminating the inaccuracies, inconsistencies, and subjective factors which are present when measurements are performed manually. The method steps and flow charts described herein constitute a disclosure of the best mode and preferred embodiment of the invention known to applicants at the time of filing, and moreover these provide sufficient information for a person having ordinary skill in the art of computer programming to produce the software for carrying out the present invention, using an IBM PC, Apple Macintosh™, or other suitable computer and associated "off-the-shelf" hardware, without requiring any significant degree of development work or testing on the part of such person.

a. Measurements

Two of the principal measurements carried out by the system of the present invention are (a) the slant angles of the strokes in the handwriting, and (b) the relative heights of the major areas of the handwriting. These angles and heights are illustrated in FIG. 1, which shows a handwriting sample 10 having a base line 12 from which the other measurements are taken; in the example shown in FIG. 1, the base line is drawn beneath the entire phrase in Sample 10 for ease of illustration, but it will be understood that in most instances, the base line will be determined separately for each stroke or letter in the sample.

Figure 1:
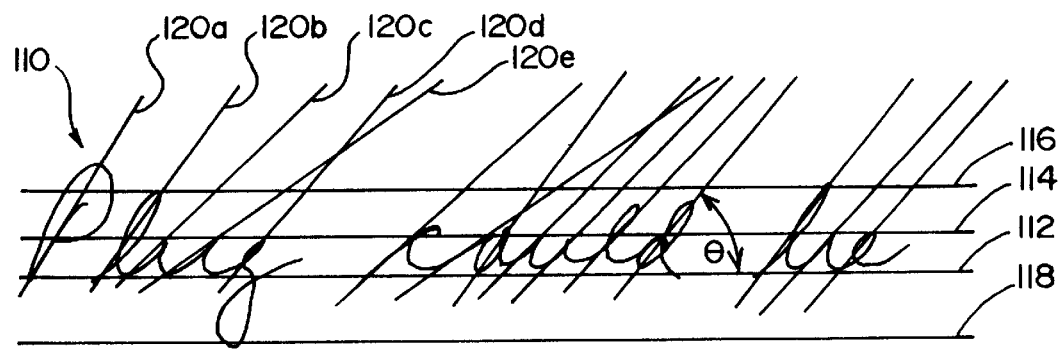
FIG. 1 is a reproduction of a sample of handwriting, marked with lines to show the major elements of the writing and the upstroke slants thereof, this being intended for purposes of illustration only, and not being intended as a technically accurate representation of the actual slant angles of the strokes.

A first area above the base line, up to line 14 in FIG. 1 defines what is known as the mundane area, which extends from the base line to the upper limit of the lower case letters the mundane area is considered to represent the area of thinking, habitual ideas, instincts and creature habits, and also the ability to accept new ideas and the desire to communicate them.

The extender letters continue above the mundane area, to an upper line 16 which defines the limit of what is termed the abstract area, which is generally considered to represent that aspect of the writer's personality which deals with philosophies, theories, and spiritual elements.

Finally, the area between base line 12 and the lower limit line 18 defined by the descending letters (e.g., "g", "y", and so on) is termed the material area, which is considered to represent such qualities as determination, material imagination, and the desire for friends, change, and variety.

The base line also serves as the reference for measuring the slant angle of the strokes forming the various letters. As can be seen in FIG. 1, the slant is measured by determining a starting point where a stroke lifts off the base line (in FIG. 1, see each of the upstrokes) and an ending point where the stroke ceases to rise, and then drawing a line (20a, 20b, 20c, 20d . . . , in FIG. 1) between these points and determining the angle Ô to the base line.

Figure 2:
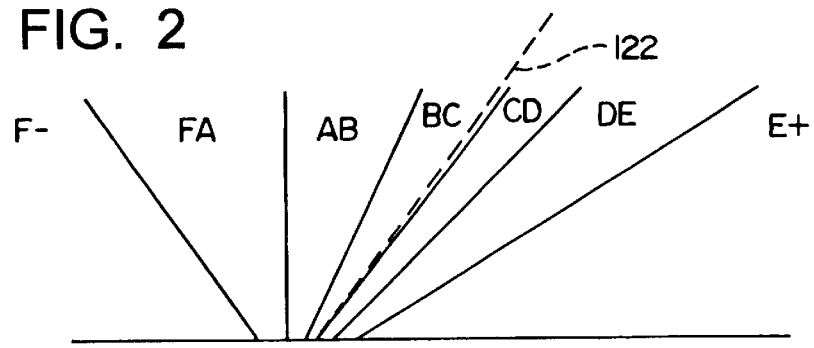
FIG. 2 is an angle scale having areas which designate a writer's emotional responsiveness based on the angle of the upstrokes, with the dotted line therein showing the average of the slant angles in the handwriting sample of FIG. 1.

The angles are summed and divided to determine the average slant angle for the sample. This average is then compared with a standard scale, or "gauge", to assess that aspect of the subject's personality which is associated with the slant angle of his writing. For example, FIG. 2 shows one example of a "slant gauge", which in this case has been developed by the International Graphoanalysis Society (IGAS), Chicago, Ill. As can be seen, this is divided into seven areas or zones—"F–", "FA", "AB", "BC", "CD", "DE" and "E+"—with each of these corresponding on a predetermined basis to some aspect or quality of the writer's personality; for example, the more extreme angles to the right of the gauge tend to indicate increasing emotional responsiveness, whereas more upright slant angles are an indication of a less emotional, more self-possessed personality; for example, the slant which is indicated by dotted line 22 lies within the zone "BC", which is an indication that the writer, while tending to respond somewhat emotionally to influences, still tends to be mostly stable and level-headed in his personality.

b. Method Steps

Figure 3:
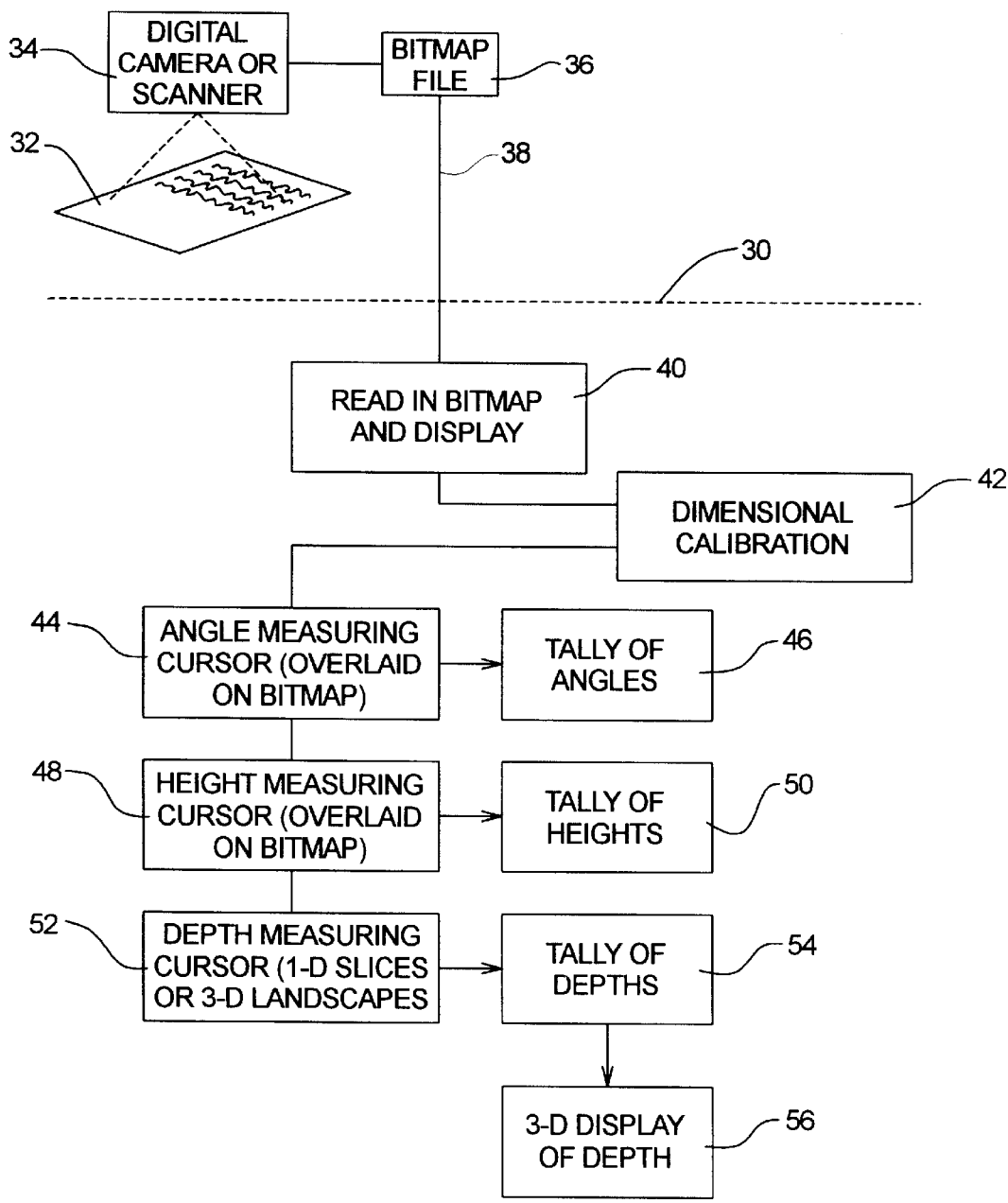
FIG. 3 is a block diagram showing the steps of obtaining a digital image of the handwriting specimen and then analyzing the relevant characteristics thereof, in accordance with the method of the present invention.

The flow chart in FIG. 3 illustrates the basic steps which are undertaken in the measurement and analysis of a handwriting sample in accordance with the present invention. Those steps above dotted line 30 in FIG. 3 may be performed either locally or at a remote site, using standardized scanning equipment, while those steps below the dotted line are preferably performed locally on the graphoanalysts receiving computer, which is loaded with software to implement the method steps of the present invention.

Accordingly, as can be seen in FIG. 3, the first step in the process is to scan a handwriting sample 32 using a digital camera or scanner 34 to create a digital bit-map file (block 36); for accuracy, it is preferred that the scanner have a reasonably high level of resolution, e.g., a scanner having a resolution of 1,000 bpi has been found to provide highly satisfactory results. These first two steps can be performed using conventional scanning equipment of this type, such as a flatbed or hand-held digital scanner for example, which are normally supplied by the manufacturer with suitable software for generating the bit-map file.

The bit-map file is next transmitted via a telephone modem or other data transmission link 38 to the analysis platform, which in FIG. 3 is represented by the area lying below dotted line 30: As was noted above, the analysis steps are performed using a computer (e.g., a suitable PC or Macintosh™ system) which has been loaded with software for carrying out the steps described below.

The initial step in the analysis phase of the process is to read in the digital bit-map file which has been transmitted from the scanner system, and to display this on the computer monitor for marking with the cursor (40). As a preliminary to conducting the measurements, the operator performs a dimensional calibration of the system (42); this can be done by placing a scale (e.g., a ruler) or drawing a line of known length (e.g., 1 centimeter, 1 inch, etc.) on the sample, then marking the ends of the line using a cursor and calibrating the display to the known distance; also, in some embodiments the subject may be asked to produce the handwriting sample on a form having a pre-printed calibration mark, which approach has the advantage of achieving an extremely high degree of accuracy.

Figure 4:
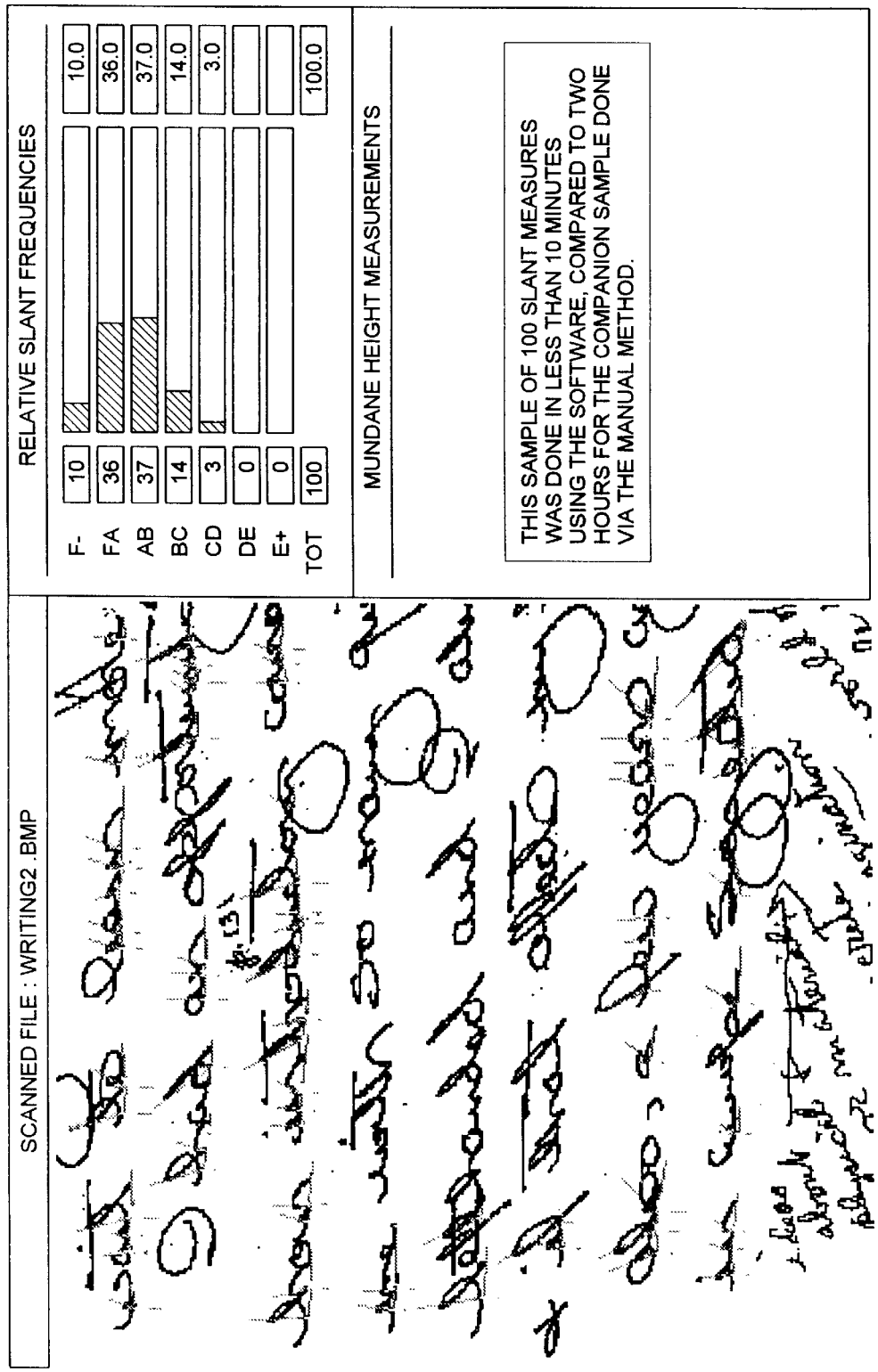
FIG. 4 is a reproduction of a sample of handwriting as this is displayed on a computer monitor in accordance with the present invention, showing exemplary cursor markings on which the measurements are based, and also showing a summary of the relative slant frequencies which are categorized by sections of the slant gauge of FIG. 2.

After dimensional calibration, the user takes the desired measurements from the sample, using a cursor on the monitor display as shown in FIG. 4. To mark each measurement point, the operator moves the cursor across the image which is created from the bit-map, and uses this to mark selected points on the various parts of the strokes or letters in the specimen.

To obtain the angle measurement (block 44 in FIG. 3), the operator first establishes the relevant base line; since the letters themselves may be written in a slant across the page, the slant measurement must be taken relative to the base line and not the page. To obtain slant measurements for analysis by the IGAS system, the base line is preferably established for each stroke or letter, by pinning the point where each stroke begins to rise from its lowest point.

In a preferred embodiment of the invention, the operator is not required to move the cursor to the exact lowest point of each stroke, but instead simply "clicks" a short distance beneath this, and the software generates a "feeler" cursor which moves upwardly from this location to the point where the writing (i.e., the bottom of the upstroke) first appears on the page. To carry out the "feeler" cursor function, the software reads the "color" of the bit-map, and assumes that the paper is white and the writing is black: If (moving upwardly) the first pixel is found to be white, the software moves the cursor upwardly to the next pixel, and if this is again found to be white, it goes up another one, until finally a "black" pixel is found which identifies the lowest point of the stroke. When this point is reached, the software applies a marker (e.g., see the "plus" marks in FIG. 4), preferably in a bright color so that the operator is able to clearly see and verify the starting point from which the base line is to be drawn.

After the starting point has been identified, the software generates a line (commonly referred to as a "rubber band") which connects the first marker with the moving cursor. The operator then positions the cursor beneath the bottom of the adjacent downstroke (i.e., the point where the downstroke stops descending), or beneath next upstroke, and again releases the feeler cursor so that this extends upwardly and generates the next marker. When this has been done, the angle at which the "rubber band" extends between the two markers establishes the base line for that stroke or letter.

To measure the slant angle, the program next generates a second "rubber band" which extends from the first marker (i.e., the marker at the beginning of the upstroke), and the operator uses the moving cursor to pull the line upwardly until it crosses the top of the stroke. Identifying the end of the stroke, i.e., the point at which the writer began his "lift-off" in preparation for making the next stroke, can be done visually by the operator, while in other embodiments this determination may be performed by the system itself by determining the point where the density of the stroke begins to taper off, in the manner which will be described below. In those embodiments which rely on visual identification of the end of the stroke, the size of the image may be enlarged (magnified) on the monitor to make this step easier for the operator.

Once the angle measuring "rubber band" has been brought to the top of the stroke, the cursor is again released so as to mark this point. The system then determines the slant of the stroke by calculating the included angle between the base line and the line from the first marker to the upper end of the stroke. The angle calculation is performed using standard geometric equations.

As each slant angle is calculated, this is added to the tally of strokes falling in each of the categories (block 46 in FIG. 3), e.g., the seven categories of the "slant gage" shown in FIG. 2. For example, if the calculated slant angle of a particular stroke is 60°, then this is added to the tally of strokes falling in the "BC" category. Then, as the measurement of the sample progresses, the number of strokes in each category and their relative frequencies is tabulated for assessment by the operator; for example, in FIG. 4, the number of strokes out of 100 falling into each of the categories F−, FA, AB, BC, CD, DE and E+ are 10, 36, 37, 14, 3, 0 and 0, respectively. The relative frequencies of the slant angles (which are principally an indicator of the writer's emotional responsiveness) are combined with other measured indicators to construct a profile of the individual's personality traits, as will be described in greater detail below.

As is shown at block 48 in FIG. 3, the next major step is to obtain the height measurements of the various areas of the handwriting, e.g., the relative heights of the mundane area, abstract area, and material area. Although for purposes of discussion this measurement is described as being carried out subsequent to the slant angle measurement step, the system of the present invention is preferably configured so that both measurements are carried out simultaneously, thus greatly enhancing the speed and efficiency of the process.

Accordingly, as the operator pulls the "rubber band" line to the top of each stroke using the cursor and then releases the feeler cursor so that this moves down to mark the top of the stroke, the "rubber band" not only determines the slant angle of the stroke, but also the height of the top of the stroke above the base line. In making the height measurement, however, the distance is determined vertically (i.e., perpendicularly) from the base line, rather than measuring along the slanting line of the "rubber band".

As was noted above, the tops of the strokes which form the "ascender letters" define the abstract area, while the heights of the strokes forming the lower letters (e.g., "a", "e") and the descending (e.g., "g", "p", "y") below the base line determine the mundane and material areas. Differentiation between the strokes measured for each area (e.g., differentiation between the ascender letters and the lower letters) may be done by the user (as by clicking on only certain categories of letters or by identifying the different categories using the mouse or keyboard, for example), or in some embodiments the differentiation may be performed automatically by the system after the first several measurements have established the approximate limits of the ascender, lower, and descender letters for the particular sample of handwriting which is being examined.

As with the slant angle measurements, the height measurements are tallied (block 50 in FIG. 3) for use by the graphoanalyst. For example, the heights can be tallied in categories according to their absolute dimensions (e.g., a separate category for each ⅟₁₆ inch), or by the proportional relationship between the heights of the different areas. In particular, the ratio between the height of the mundane area and the top of the ascenders (e.g., 2×the height, 2½×, 3×, and so on) is an indicator of interest to the graphoanalyst.

The depth measurement phase of the process, as indicated at block 52 in FIG. 3, differs from the steps described above, in that what is being measured is not a geometric or dimensional aspect of each stroke (e.g., the height or slant angle), but is instead a measure of its intensity, i.e., how hard the writer was pressing against the paper when making that stroke. This factor in turn is used to "weight" the character trait which is associated with the stroke; for example, if a particular stroke indicates a degree of hostility on the part of the writer, then a darker, deeper stroke is an indicator of a more intense degree of hostility.

While graphoanalysts have long tried to guess at the pressure which was used to make a stroke so as to use this as a measure of intensity, in the past this has always been done on an "eyeball" basis, resulting in extreme inconsistency of results. The present invention eliminates such inaccuracies: In making the depth measurement, a cursor is used which is similar to that described above, but in this case the "rubber band" is manipulated to obtain a "slice" across some part of the pen or pencil line which forms the stroke. Using a standard grey scale (e.g., a 256-level grey scale), the system measures the darkness of each pixel along the track across the stroke, and compiles a list of the measurements as the darkness increases generally towards the center of the stroke and then lightens again towards the opposite edge. The darkness (absolute or relative) of the pixels and/or the width/length of the darkest portion of the stroke are then compared with a predetermined standard (which preferably takes into account the type of pen/pencil and paper used in the sample), or with darkness measurements taken at other areas or strokes within the sample itself, to provide a quantifiable measure of the intensity of the stroke in question.

Figure 8:
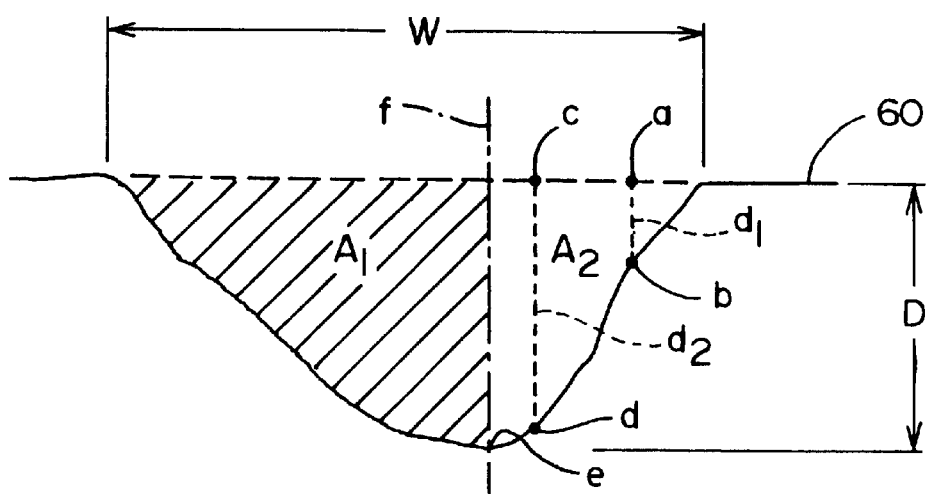
FIG. 8 is a two-dimensional image showing a "valley" which represents increasing and decreasing grey-scale darkness/intensity which is measured across a stroke of the writing, showing the manner in which the two sides of the image are weighted relative to one another to ascertain the angle at which the writing instrument engaged the paper as the stroke was made.

As is shown in FIG. 8, the levels of darkness measured along each cut may be translated to form a two-dimensional representation of the "depth" of the stroke. In this figure (and in the corresponding monitor display), the horizontal axis represents the linear distance across the cut, while the vertical axis represents the darkness which is measured at each point along the horizontal axis, relative to a base line 60 which represents the color of the paper (assumed to be white).

Accordingly, the two-dimensional image forms a valley "v" which extends over the width "w" of the stroke. For example, for a first pixel measurement "a" which is taken relatively near the edge of the stroke, where the pen/pencil line is somewhat lighter, the corresponding point "d" on the valley curve is a comparatively short distance "$d_1$" below the base line, whereas for a second pixel measurement "c" which taken nearer to the center of the stroke where the line is much darker, the corresponding point "d" is a relatively greater distance "$d_2$" below the base line, and so on across the entire width "w" of the stroke. The maximum depth "D" along the curve "v" therefore represents the point of maximum darkness/intensity along the slice through the stroke.

As can be seen at block 54 in FIG. 3, the depth measurements are tallied in a manner similar to the angle and height measurements described above, for use by the graphoanalyst by comparison with predetermined standards. Moreover, the depth measurements for a series of slices taken more-or-less continuously over part or all of the length of the stroke may be compiled to form a three-dimensional display of the depth of the stroke (block 56 in FIG. 3), as which will be described in greater detail below.

Referring to blocks 46, 50, and 54 in FIG. 3, the system thus assembles a complete tally of the angles, heights, and depths which have been measured from the sample. As was noted above, the graphoanalyst can compare these results with a set of predetermined standards so as to prepare a graphoanalytical trait inventory, such as that which is shown in FIG. 5, this being within the skill of a graphoanalyst having ordinary skill in the relevant art.

Figure 6:
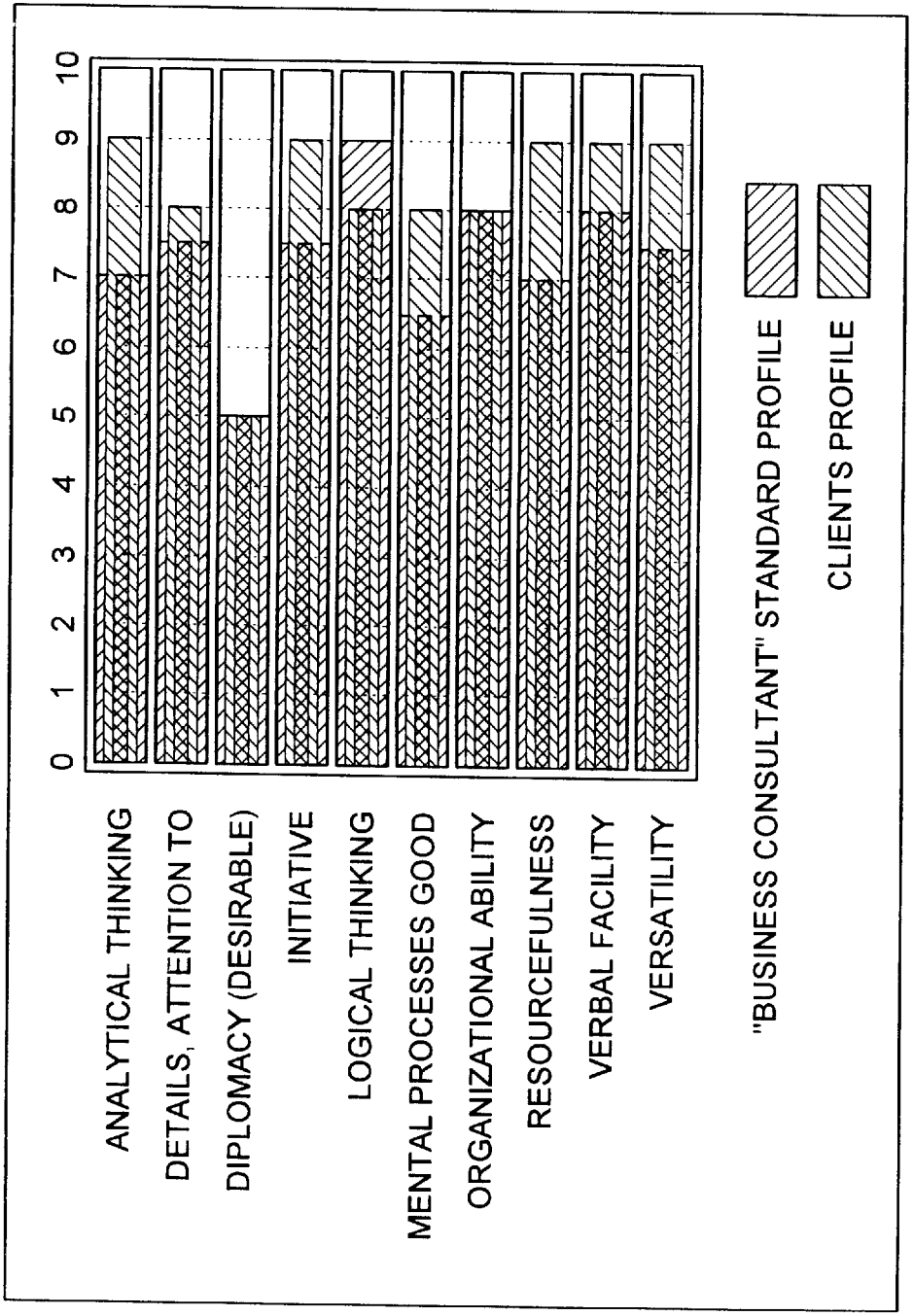
FIG. 6 is a trait profile comparison produced in accordance with the method of the present invention by summarizing the trait inventories in FIG. 4.

The trait inventory can in turn be summarized in the form of the trait profile for the individual (see FIG. 6), which can then overlaid on or otherwise displayed in comparison with a standardized or idealized trait profile. For example, the bar graph 58 in FIG. 6 compares the trait profile which has been determined for the subject individual against an idealized trait profile a "business consultant", this latter having been established by previously analyzing handwriting samples produced by persons who have proven successful in this type of position. Moreover, in some embodiments of the present invention, these steps may be performed by the system itself, with the standards and/or idealized trait profiles having been entered into the computer, so that this produces the trait inventory/profile without requiring intervention of the human operator.

c. 3-D Stroke Analysis

The primary advantages of those aspects of the process which have been described above are that these enable the graphoanalyst to acquire, manipulate, and analyze certain measurements in a far faster, more efficient, and accurate manner than has been possible in the past. However, as was noted above, the compilation of "depth" measurements to produce a "3-dimensional" display of the stroke depth provides the graphoanalyst with an entirely new analysis tool, which before now has not been available in any form whatsoever.

Figure 7:
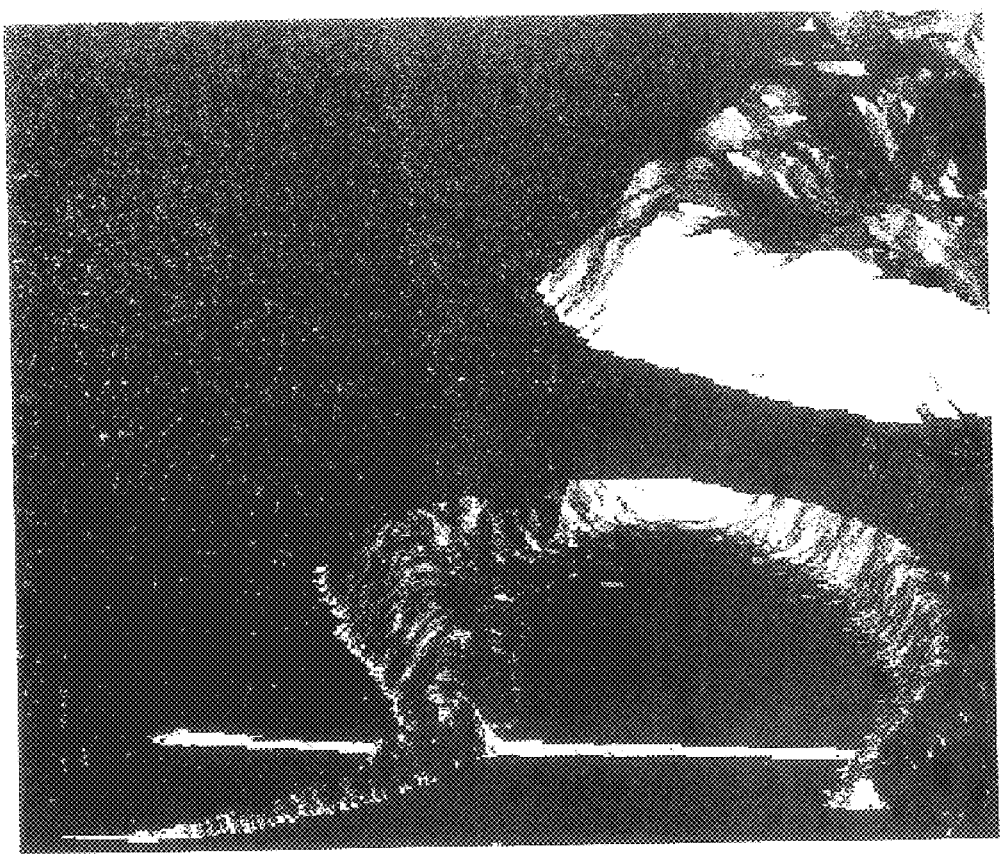
FIG. 7 is a reproduction of a computer-generated image of a portion of the handwriting specimen, with this being manipulated by the system to produce a three-dimensional image in which the strokes of the writing appear as channels or valleys in the paper.

Specifically, by compiling a substantially continuous series of the 2-D depth "valleys" and then panning of the view, a 3-dimensional display of the writing which can be produced as is shown in FIG. 7. In this view, the writing appears in the form of a "3-D" valley or groove across the paper, wherein the greatest depths represent those areas where the pressure on the pen/pencil point was the greatest when the writing was formed.

Thus, by examining of the 3-D image, the graphoanalyst is able to ascertain whether the pen/pencil tip was being either "pushed" or "dragged" by the writer's hand through a particular stroke or portion of a stroke, which in turn makes it possible to ascertain whether the writer was using his right or left hand, this being primarily of interest when trying to determine the identity of a writer or the authenticity of a writing (despite past efforts, this capability, i.e, the ability to accurately determine whether the writer was right or left handed, has never really existed in the graphoanalytical art prior to the present invention). Areas of the writing which are especially indicative of the angle/direction of pressure on the pen/pencil point are the loops of letters and other tight turns, where the present invention renders it highly evident whether the pen/pencil was being pushed or pulled through the curve.

Furthermore, this aspect of the present invention makes it possible to make these and related determinations in a truly quantitative manner. As can be seen in FIG. 8, this is accomplished by determining the lowermost point or bottom "e" of the valley, and then calculating the areas A1 and A2 on either side of a dividing line "f" which extends upwardly from the bottom of the valley, perpendicular to the plane of the paper surface: that side having the greater area (e.g., $A_1$ in FIG. 8) represents that side of the stroke on which the pressure of the pen/pencil point was greater, and therefore indicates which hand the writer was using to form the stroke or other part of the writing.

As a further step, the areas A1, A2 can be compiled and integrated over a continuous section of the writing. Conceptually, the line "f" thus forms a divider plane or "wall" which separates the two sides of the valley. The relative weights of the two sides can then be determined by calculating the respective volumes, in a manner somewhat analogous (conceptually) to filling the area on either side of "wall" with water. For the convenience of the user, the "water" can be represented graphically during this step by using a contrasting color (e.g., blue) to alternately fill each side of the "valley" in the 3-D display.

It is to be recognized that various alterations, modifications, and/or additions may be introduced into the constructions and arrangements of parts described above without departing from the spirit or ambit of the present invention.

What is claimed is:

1. A method for analysis of a handwriting sample, comprising the steps of:

creating a digital bit-map of said handwriting sample, the bit map comprising information indicative of a relative darkness of a plurality of portions of said handwriting sample, and a location of said plurality of portions of said handwriting sample;

creating a plurality of two-dimensional representations of the handwriting sample based on the information indicative of the relative darkness and location of the plurality of portions of the handwriting sample;

arranging said two-dimensional representations to form a three-dimensional representation of the information indicative of the relative darkness and location of said plurality of portions of said handwriting sample; and analyzing said handwriting sample determining an angle of a writing instrument which formed said handwriting sample based on the three-dimensional representation.

2. The method of claim 1, wherein the step of creating a digital bit map comprises:

forming a digital camera image of said handwriting sample.

3. The method of claim 1, wherein the step of creating a digital bit-map comprises:

forming a digital scanner image of said handwriting sample.

4. The method of claim 1, in which the step of analyzing said handwriting sample comprises the step of comparing at least two of the plurality of two-dimensional representations.

5. The method of claim 4, further comprising the steps of:

arranging said plurality of two-dimensional representations in accordance with a predetermined scheme; and comparing the arrangement of two-dimensional representations with a predetermined standard so as to determine one or more characteristics relating to a person who produced said handwriting sample.

6. The method of claim 4, further comprising the step of determining at least one of an angle and a pressure of said writing instrument which formed said stroke based on the three-dimensional representation.

7. The method of claim 1, in which the plurality of portions of said handwriting sample correspond to pixels.

8. The method of claim 1, in which the information indicative of relative darkness of the plurality of portions of said handwriting sample is gray-scale data.

9. The method of claim 1, in which the step of analyzing said two-dimensional representation comprises comparing the two-dimensional representation with a predetermined standard.

10. The method of claim 1, in which the step of analyzing said two-dimensional representation comprises determining at least one of a width and a length of a stroke portion of the handwriting sample associated with a plurality of portions of said handwriting sample.

11. The method of claim 1, further comprising the step of creating a two-dimensional image based on the three-dimensional representation.

12. The method of claim 11, in which the step of creating the two-dimensional image comprises:

defining first and second axes of the two-dimensional image;

representing the information indicative of the location of said plurality of portions of said handwriting sample against the first axis of the two-dimensional image; and representing the information indicative of the relative darkness of said plurality of portions of said handwriting sample against the second axis of the two-dimensional image.

13. The method of claim 12, in which the step of creating the two-dimensional image comprises identifying stroke and background portions of the handwriting sample; and plotting the background portion of the handwriting sample at a predetermined location along the second axis of the two-dimensional image.

14. The method of claim 1, further comprising the steps of:

marking at least first and second points on said bit map which correspond to selected locations on said handwriting sample; and comparing said at least first and second points on said bit map so as to obtain a selected measurement of said handwriting sample.

15. The method of claim 14, further comprising the step of identifying a stroke portion of said handwriting sample, where the selected measurement of said handwriting sample is at least one of stroke angle and stroke height of the stroke portion of the handwriting sample.

16. The method of claim 15, further comprising the steps of:

analyzing the two-dimensional representation to determine intensity of the stroke portion of the handwriting sample; and comparing at least one of stroke angle, stroke height, and stroke intensity against a predetermined trait inventory.

17. The method of claim 1, further comprising the step of identifying a stroke portion of said handwriting sample, where the two-dimensional representation is analyzed to determine stroke intensity of the stroke portion of the handwriting sample.

18. The method of claim 1, further comprising the step of identifying a stroke portion of said handwriting sample, where the two-dimensional representation is analyzed to determine a stroke direction in which the writing instrument moved to create the stroke portion of said handwriting sample.

19. The method of claim 18, further comprising the step of identifying whether a writer who created said handwriting sample was right handed or left handed based on the stroke direction.

20. The method of claim 1, further comprising the steps of:

identifying a stroke portion of said handwriting sample;

identifying a stroke boundary of the stroke portion of the handwriting sample; and analyzing at least one of a representation depth and a representation height of the three-dimensional representation within the stroke boundary.

21. The method of claim 1, further comprising the steps of:

identifying a stroke portion of said handwriting sample; and identifying a dividing line at a location within the stroke portion of said handwriting sample corresponding to at least a local maximum relative darkness.

22. The method of claim 21, further comprising the steps of:

identifying a boundary of the stroke portion of said handwriting sample;

determining whether a writer who created said handwriting sample was right handed or left handed based on the stroke boundary and the dividing line.

* * * * *